United States Patent
Wall

(10) Patent No.: US 6,669,451 B1
(45) Date of Patent: Dec. 30, 2003

(54) SCREEN PLATE FILTER FOR LOW PRESSURE SIDE OF AUTOMOTIVE AIR CONDITIONING COMPRESSOR

(76) Inventor: Thomas M. Wall, 124 Montcastle Ct., Nashville, TN (US) 37221

( * ) Notice: Subject to any disclaimer, the term of this patent is extended or adjusted under 35 U.S.C. 154(b) by 0 days.

(21) Appl. No.: 09/900,338

(22) Filed: Jul. 6, 2001

Related U.S. Application Data

(60) Provisional application No. 60/216,288, filed on Jul. 6, 2000.

(51) Int. Cl.$^7$ ................................................ F04B 39/00
(52) U.S. Cl. ...................... 417/313; 210/168; 210/171; 210/462; 62/118; 62/149
(58) Field of Search .................... 417/313, 53; 210/168, 210/171, 459, 460, 462; 62/114, 118, 149

(56) References Cited

U.S. PATENT DOCUMENTS

| | | | |
|---|---|---|---|
| 4,556,484 A | * 12/1985 | Hunter et al. ................ | 137/798 |
| 5,467,611 A | 11/1995 | Cummings et al. ............ | 62/299 |
| 5,562,427 A | 10/1996 | Mangyo et al. .............. | 417/313 |
| 6,176,093 B1 | * 1/2001 | Stein et al. ................... | 55/428 |

OTHER PUBLICATIONS

SCS/Frigette Illustrated Catalog Cover and p. 446, date unknown, by SCS/Figette, P.O. Box 40557, Fort Worth, Texas, 76140.

Four Seasons 2000 Illustrated Guide AC–52 Temperature Control Products and p. 249, by Four Seasons Division of Standard Motor Products, Inc., date unknown.

Cut Compressor Comebacks, Airsept Inc., 1155 Allgood Road, Suit 6, Marietta, GA 30062 (1999).

* cited by examiner

*Primary Examiner*—Cheryl J. Tyler
*Assistant Examiner*—Emmanuel Sayoc
(74) *Attorney, Agent, or Firm*—Waddey & Patterson; Howard H. Bayless

(57) ABSTRACT

An inlet port filter plate for attachment between a compressor inlet port and a suction hose assembly. The inlet port filter plate includes a main body and mounting surfaces for attachment between the compressor and the suction hose assembly or between the compressor and the compressor hose block. The main body defines a passage that allows for refrigerant flow through a filter which is positioned in the passage. The filter is adapted to stop debris in the refrigerant flow.

13 Claims, 4 Drawing Sheets

SCREEN PLATE FILTER FOR LOW PRESSURE SIDE OF AUTOMOTIVE AIR CONDITIONING COMPRESSOR

This application claims benefit of co-pending Provisional U.S. Patent Application Serial No. 60/216,288 filed Jul. 6, 2000, entitled "Screen Plate Filter for Low Pressure Side of Automotive Air Conditioning Compressor."

BACKGROUND OF THE INVENTION

The present invention relates generally to apparatus and devices to improve the long term performance of automotive air conditioning systems. More particularly, this invention pertains to a Compressor Inlet Port (CIP) filter plate. The CIP filter plate is an improved apparatus and method for removing potentially damaging debris from the low suction side of an air conditioning circuit.

The current rate of failures for rebuilt automotive air conditioning compressors has been estimated at about 20%. The costs of these failures affect everyone from the compressor rebuilders to the customer that has paid for the failed compressor.

FIG. 1 shows a schematic view of an automotive air conditioning system 100. Under normal operating circumstances, the refrigerant 102 in the air conditioning system 100 moves in only one direction as indicated by the refrigerant flow direction arrow 101. Unless some internal failure occurs to the air conditioning compressor 104, the refrigerant 102 will always move from the compressor 104 through the suction hose assembly 140 through the condenser 105 through the orifice filter 106 through the evaporator 108 and then back to the compressor 104. The orifice filter 106 can be designed to restrict flow and also to provide a filtering function to stop any debris large enough to damage a compressor from circulating in the air conditioning system 100. Air conditioning systems 100 can also have additional components such as dryers, accumulators, VIR valves and mufflers which are not discussed in this example. The locations of these or other additional components will vary from manufacturer to manufacturer and are thus omitted from this paper.

FIG. 2 shows a typical compressor 104 failure in an air conditioning system 100. First, the compressor 104 begins an internal failure. Second, the debris 116 from the internal failure of the compressor 104 moves into the high-pressure side 110 of the air conditioner system 100. This debris 116 is generally stopped by the orifice filter 106. This initial failure of the compressor 104 can continue for quite some time. In the next major step, the compressor 104 fails internally to the extent that the debris 116, which has accumulated in the high-pressure side 110, is carried by the refrigerant 102, as the refrigerant moves backwards through the compressor 104 to the low-pressure side 112 of the air conditioning system 100, as indicated by refrigerant flow direction arrow 101. The low-pressure side 112 normally operates in the 30 PSI range, while the high-pressure side 110 normally operates in the 200 PSI range. So, the difference in pressure between the two sides can normally be in the 170 PSI range during this reverse flow of refrigerant. Thus, this reversed flow of debris 116 is under significant difference pressure as it enters the low-pressure side 112 and accumulates in low-pressure side components such as the suction hose assembly 140 and the evaporator 108 of the air conditioning system 100. Due to the high differential pressure of the reverse flow, the debris 116 moves rapidly and with enough force to cause some of the debris 116 to become imbedded into the flexible hose part of the suction hose assembly 140. Some debris 116 will also accumulate between the flexible hose material and the flexible hose fittings. This debris 116 also accumulates in other components such as the dryer (not shown) and the evaporator 108. This complete failure of the compressor 104 results in the need for a system repair.

The normal sequence of repair procedures for an air conditioning system 100, begins by removing the compressor 104. Next, one removes the orifice filter 106 and the dryer (not shown). Then one will flush the air conditioning system 100, replace the dryer (not shown) replace the orifice filter 106, and finally, replace the compressor 104 and recharge the air conditioning system 100 with refrigerant 102. This will generally place the air conditioning system 100 back into an operating order. However, no amount of flushing will remove all of the debris 116, which has become imbedded into the flexible hose material of the suction hose assembly 140 and is trapped between the flexible hose and the hose fittings. Over some period of time (due to pressure and temperature changes) some of the imbedded and trapped debris 116 will loosen and be carried by the refrigerant 102 through the compressor inlet port connection 132 and into the compressor inlet suction port 130 of the compressor 104. This will very often cause another compressor 104 failure. The solution to this problem is to install a filter 240 into the low-pressure side of the air conditioning system 100. The present invention provides this filter 240 and eliminates the problems associated with the compressor inlet port filters and the press-into-hose block filters which are currently on the market.

Methods and devices presently exist to accomplish the removal of debris 116 from the low-pressure side 112 of an air conditioning system 100. There include several types of filters to trap debris before it can enter the compressor.

GENERAL MOTORS CORP. (trademark) and other manufacturers have installed filter screens in several models of air conditioning compressors. These filters are generally installed on the inlet or outlet ports of the compressors. GENERAL MOTORS CORP. (trademark) has previously used a filter screen on the inlet port for filtering debris from the refrigerant flow. This protects the compressor from debris, but doesn't allow for the possibility for failure of other components. Generally, the filter cannot be cleaned without removing and sometimes disassembling the compressor.

Another method of installing a filter in an existing air conditioning system relies on pressing a small mesh filter into the suction port of a suchtion hose assembly (also known as a hose block) in a manner much like the GENERAL MOTORS CORP. (trademark) method of installing a filter into an actual compressor. This hose block filter system is available as a kit with different size filters and a small mechanical press designed to press the filter into the hose block suction port. There are several problems with this method above those already described above. First, the mechanical press is designed primarily for GENERAL MOTORS CORP. (trademark) type hose blocks and is difficult or impossible to use for other applications. Second, the filters must be made in different diameters and sizes for different styles of compressors and the use of the wrong diameter filter could result in damage to the hose block or the compressor. Third, the tolerances in the diameter of the filters are critical and can vary due to manufacturing processes and the different metals, such as aluminum and steel, involved in different applications. Fourth, hose blocks made by different companies for aftermarket parts might not have been made to the same dimensions as the original equipment part. Fifth, the cleaning of the debris from the filter requires removal of the filter from the hose block which often results in destruction of the filter. Sixth, because of the press-in interference fit and mounting ring of this design, the filter reduces the effective size of the port and further restricts the flow of the refrigerant. On the majority of GENERAL MOTORS (trademark) vehicles where the filter would be installed, the outside diameter of the filter is 0.510 inch. The suction hose assembly connector internal diameter 134 is 0.500 inch, resulting in a flow area of 0.196 sq. in. The inside diameter of the filter is approximately 0.415 inch for flow area of 0.135 sq. in. Thus, the area that the refrigerant must pass through has been reduced from 0.196 sq. in. to 0.135 sq. in. This is a reduction in area of approximately 31%. Thus, this press-fit filter installation provides a significant reduction in the area for refrigerant flow and thereby increases the restriction to refrigerant flow. Seventh, the hose block must be cleaned in order to properly press the filter into the hose block without gouging the system with the debris. Several manufacturers have noted problems between the cleaning solvents and different types of AC refrigerants. Cleaning access to the hose side of the hose block requires either disconnecting the hose and introducing potential problems with the connection, or flushing the entire suction hose assembly and increasing the residual solvent for reaction with the refrigerant. Finally, because of the similar port sizes in the hose block and the compressor, an improperly installed press-fit filter could come loose and go into the compressor and cause it to fail.

A final prior art method for installing a filter on existing air conditioning systems teaches one to cut either the flexible or metal air conditioning line and install a filter on the air conditioning suction hose connected to a fitting or hose block which connects to the compressor. The hose cut method often leads to an unacceptable leakage rate of refrigerant. With R-134a refrigerant, it is almost impossible to prevent leakage when a filter is installed in a flexible hose and secured with standard hose clamps. In addition, cutting a metal line or a flexible hose allows the possibility of additional debris entering the compressor. Furthermore, due to the size of the filters now on the market and the design clearances of existing systems, it is often impossible to install an inline filter near the compressor on the suction side. Thus, it is sometimes necessary to install the filter in a location where it will not perform with maximum effectiveness, since the greater the distance between the compressor and the filter, the greater the possibility of damaging debris becoming dislodged and entering and damaging the compressor.

Thus, it may be seen that these prior art methods require additional labor and often require very specialized tools for installation. These and other known methods, if not performed correctly, could actually increase the potential for damage to the compressor. What is needed, then, is a method for installing a filter to an existing air conditioning system to reduce the potential for compressor failure caused by debris in the low pressure side of an air conditioning system. The present invention provides an easy solution for the basic cause of these problems, provides a method for removal of the screen for cleaning, and provides for an easier installation of the screen as identified in the detailed discussion.

SUMMARY OF THE INVENTION

The purpose of this device is to significantly reduce one of the major causes of failures of air conditioner compressors. The present invention is directed toward an inlet port filter plate 200 for attachment between a compressor inlet suction port 130 and a suction hose assembly 140 (or hose block) on an automotive air conditioning system 100. The inlet port filer plate 200 is designed with a main body 210 which defines a first passage, 220 a first side, 212 and a second side 216. The first passage 220 is adapted to allow a refrigerant 102 to flow between the first side 212 and the second side 216. The second side 216 is adapted to be sealably connected to the suction inlet hose assembly 140 (or hose block) and the first side 212 is adapted to be sealably connected to the compressor inlet suction port 130. A filter 240 is positioned across the first passage 220 so that the filter 240 will stop debris 116 in the refrigerant 102 flow before it enters the compressor 104. This allows for the inlet port filter plate 200 to protect the compressor 104 against reverse flow of debris 116 through the compressor 104 associated with a compressor failure and the resulting flow of debris 116 out of the suction hose assembly 140 and into the compressor 104. This apparatus provides an easy to install and remove inlet port filter plate 200 assembly which allows for cleaning of both sides of the filter 240 without removing the compressor 104, and provides an easily retrofit filter 240 for installation in already existing systems.

The main body 210 of this inlet port filter plate 200 provides a first connection opening 214 for receiving a compressor inlet port connector 132 for attachment of the filter plate to the compressor inlet suction port 130. The first connection opening 214 can also be configured as a connection slot which allows for the main body 210 to receive a connector without having to completely surround the connector so that the inlet port filter plate 200 may slide into position while the connector is still attached to the compressor. The main body 210 of this inlet port filter plate 200 provides a second connection opening 218 for receiving a suction hose assembly connector 142 for attachment of the filter plate to the suction hose assembly 140. The main body 210 also defines the corresponding structures which allow for sealing connections to the compressor inlet port and hose assemblies. One example of these structures is a gasket receiving area 300 for receiving a gasket for sealing the main body 210 to either the compressor inlet suction port 130 or the suction hose assembly 140.

Another advantage of the present invention allows for the installation of the filter 240 between the inlet compressor inlet suction port 130 and the suction hose assembly 140 while adapting for existing configuration and design clearances. In one embodiment of the present invention the first and second sides 212, 216 of the main body 210 are parallel so that the filter 240 may be installed between the compressor inlet suction port 130 and the suction hose assembly 140 while merely extending the suction hose assembly 140 outward from the compressor inlet suction port 130 in a parallel relationship. This allows for the utilization of design clearances that are immediately behind the suction hose assembly 140 in a perpendicular direction from the suction hose assembly 140. However, other systems may require a rearrangement of the positioning of the suction hose assembly 140 in order to allow for the available design clearances. Thus, the inlet port filter plate 200 may also have the first and second side 212, 216 positioned in a nonparallel relationship to angle the suction hose assembly 140 off of the inlet hose block to utilize these available design clearances. In this manner the compressor inlet port filter plate 200 assembly can be installed in a previously designed system using the allowable design clearances for the suction hose assembly 140 and the main body 210. This method allows for the connection of the suction hose assembly 140 to the inlet port filter plate 200 and a further connection to the compressor inlet suction port 130 which allows for the suction hose assembly to be repositioned within the design clearances of the previous design.

The suction hose assembly 140 may utilize an extension flange 310 in order to properly align the pieces for connection. The present invention adapts for these extension flanges 310 by having an extension flange receiving area 302 in the first passage 220 for receiving these connection flanges. Similarly, the present invention adapts for these extension flanges 310 by having a main body extension flanges 315 for aligning with the compressor inlet suction port 130. This first passage 220 can also have a filter receiving section area 230 with a larger opening specifically designed to receive a large filter 240 for filtering the refrigerant 120 flow. This filter 240 is generally a cup screen filter 241 comprising of a mesh portion 242 and an engagement portion 244 each constructed from a refrigerant corrosion resistant material such as a stainless steel mesh. In one preferred embodiment, the filter 240 is installed into a recessed filter receiving area 234 within the first passage 220. The filter is comprised of a steel mesh screen 243 and an engagement ring 245, which is installed into the recessed filter receiving area 234. The metal around and at the edge of the engagement ring 245 can be crimped to secure the filter 240 into the main body 210. In order to adapt for a previous design configuration that allows the after market installation of the filter plate onto existing systems, a second passage 221 can also be defined by the main body 210 which allows for a second or additional refrigerant flow to pass between the first and second side 212, 216. A filter 240 can also be placed in this second passage 221.

DESCRIPTION OF THE PREFERRED EMBODIMENTS

Figure 1:
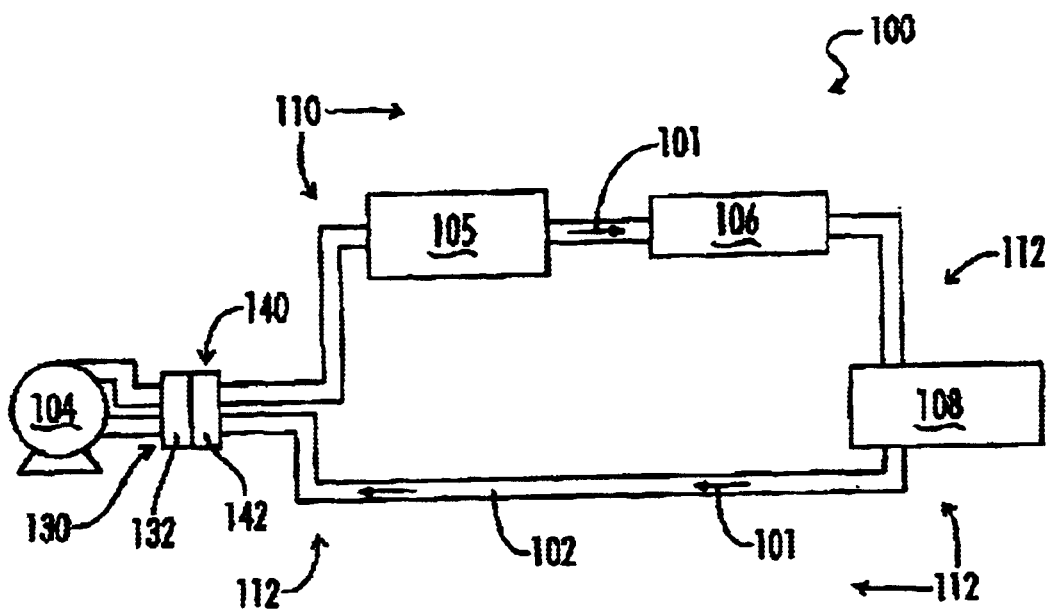
FIG. 1 shows a schematic of an automotive air conditioning system.
Figure 2:
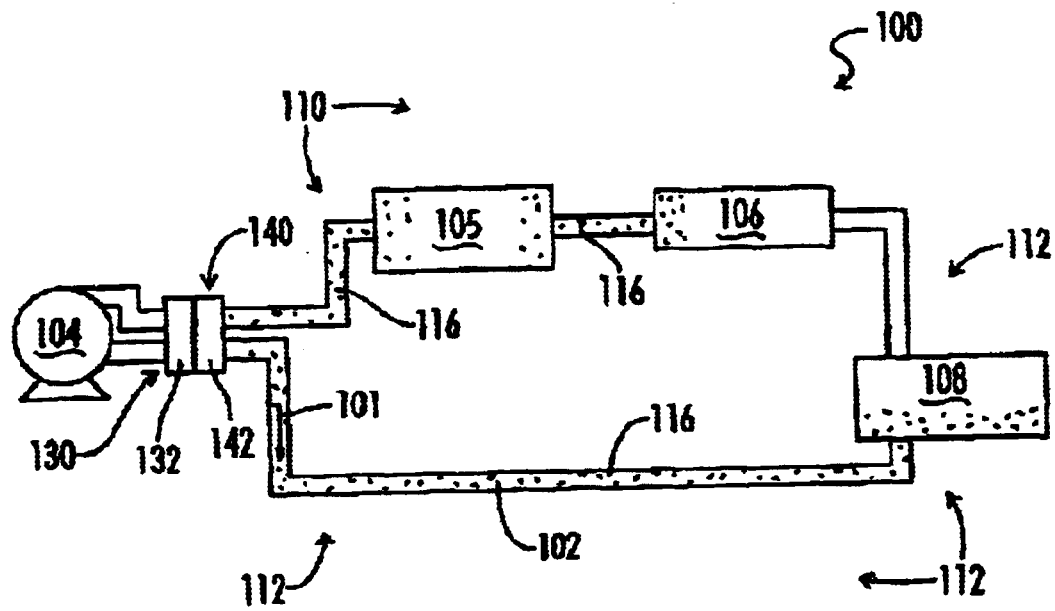
FIG. 2 shows the schematic of FIG. 1 and further shows the debris travel following a major compressor failure.

When installing a filter in an air conditioning system 100, the filter 240 should be located as close as possible to the compressor inlet suction port 130 and between the compressor inlet suction port 130 and the suction hose assembly 140. As shown in FIGS. 3 through 10, the inlet port filter plate 200 of the present invention includes the filter 240 installed in a main body 202 which is designed to fit between the compressor inlet suction port 130 and the suction hose assembly 140 associated with the compressor 104. The inlet plate filter plate 200 is designed to be very economical in material costs and ease of installation to encourage maximum usage. The operation of the device may be illustrated by a description of the method of failure of the system 100.

When a system fails, debris 116 travels from the compressor 104 through the condenser 105. The debris 116 will stop at the orifice filter 106. When the compressor 104 fails completely, the refrigerant 102 in the high pressure side 110 of the system 100 moves in the reverse direction to the low-pressure side 112 of the system 100 thus carrying entrained debris 116 back into the compressor 104. If the inlet port filter plate 200 is already installed in the system, the inlet port filter plate 200 will stop this debris 116 from leaving the compressor 104 and entering the low pressure side 112 of the system 100. However, if the inlet port filter plate 200 is not already in place when the failure occurs, then some debris 116 will become partially embedded in suction hose assembly 140 due to the refrigerant 102 flow from the high-pressure side 110 carrying the debris 116 into the low pressure side 112. After replacement of the compressor 104 and installation of the inlet port filter plate 200, the filter 240 will then prevent this debris from entering the new compressor when refrigerant flow is again initiated.

The inlet port filter plate 200 is also designed to remove any other type of debris 116 that becomes dislodged from the suction hose assembly 140 during normal operation of the air conditioning refrigerant system 100 before it can enter and damage the compressor 104. The AD mesh stainless steel screen filter 240 traps debris 116 from the air conditioning systems 100 which could damage the compressor 104. The filter 240 is designed to trap a maximum amount of debris 116 with a minimum restriction of refrigerant 102 flow.

Figure 3:
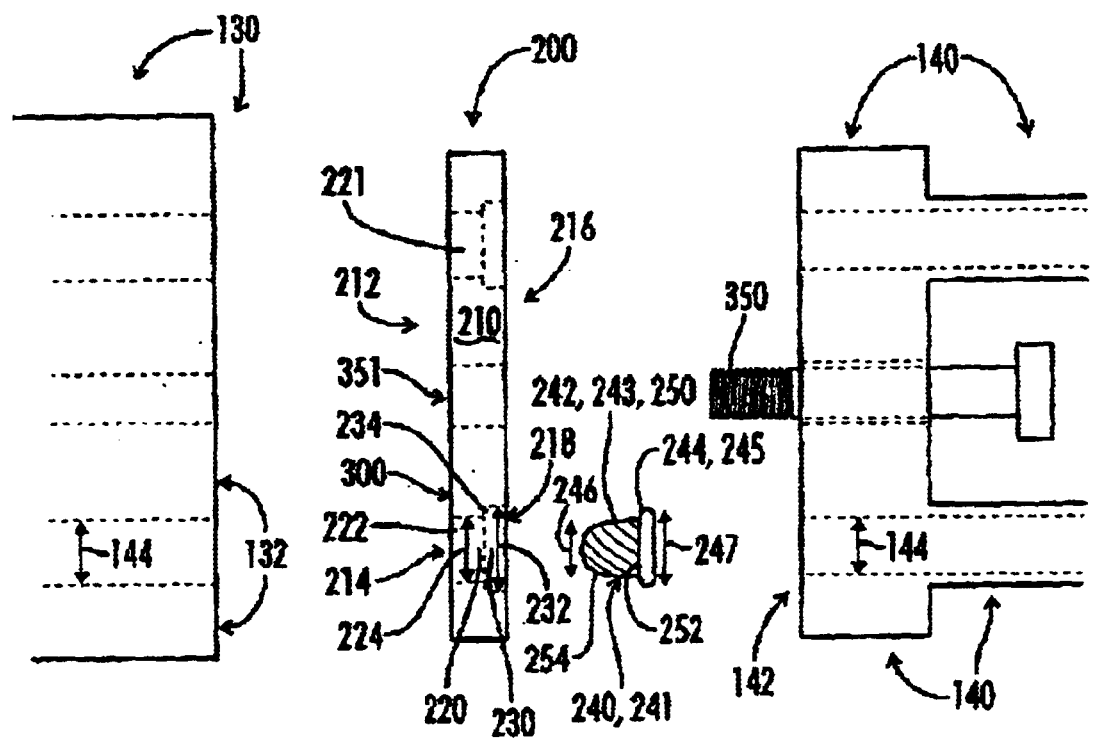
FIG. 3 shows an "exploded view" of one embodiment of an inlet port filter plate positioned between the compressor inlet suction port and the suction hose assembly.
Figure 4:
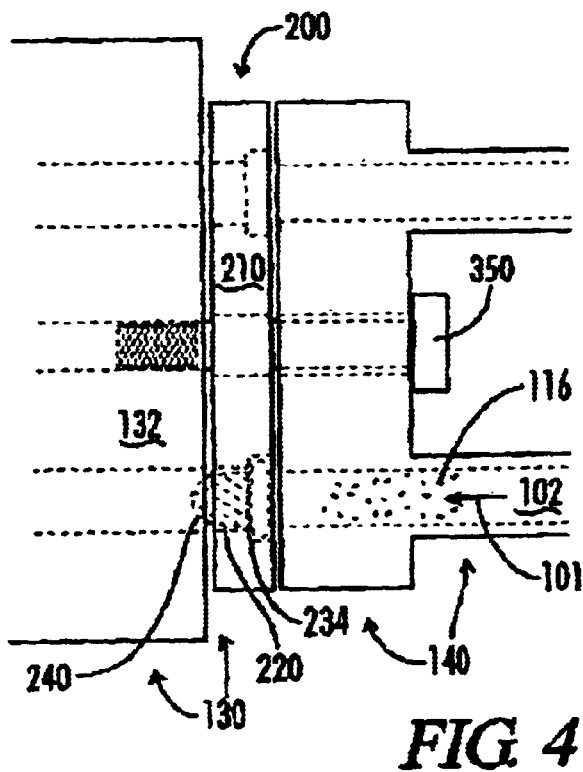
FIG. 4 shows an "assembled view" of the inlet port filter plate of FIG. 3 installed between the compressor inlet suction port and the suction hose assembly.
Figure 5:
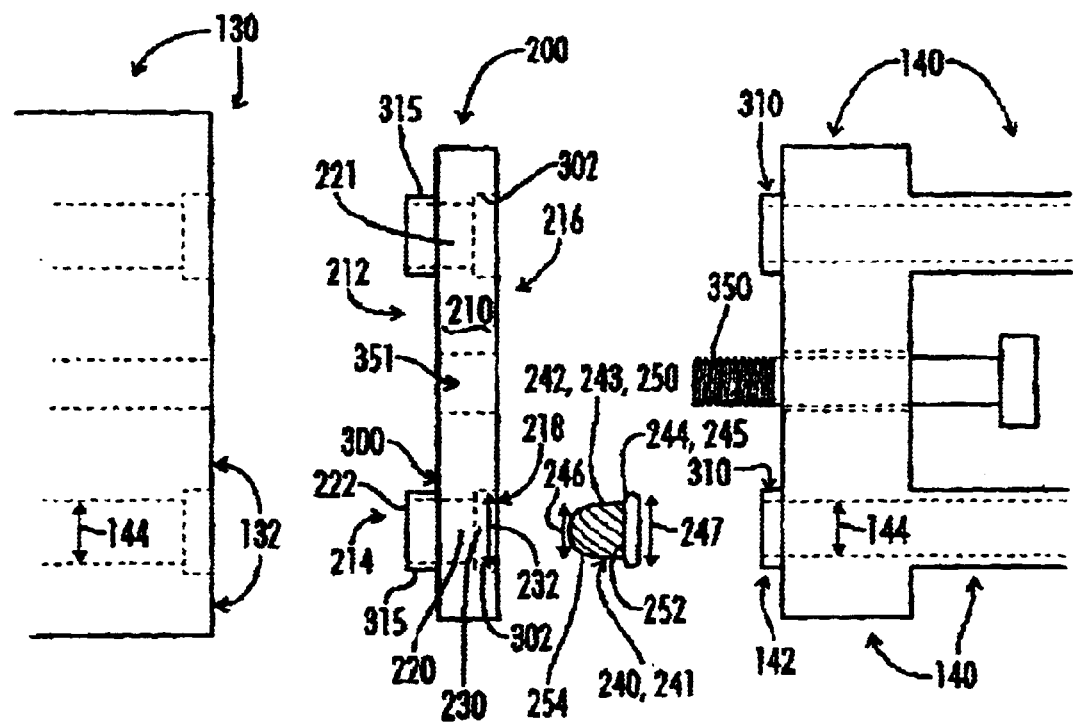
FIGS. 5 and 6 show the inlet port filter plate of FIGS. 3 and 4, respectively, with extension flanges.
Figure 6:
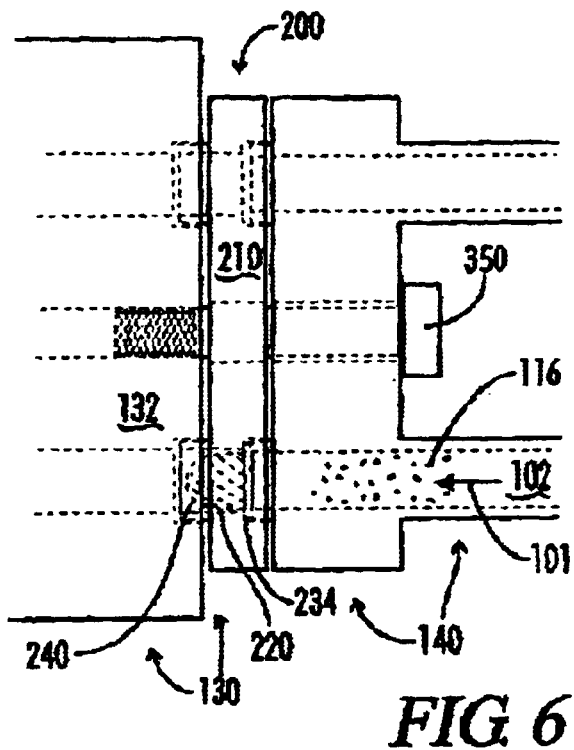

FIGS. 3 and 4 shows how the cup screen filter 240 is installed in the first passage 220. The cup screen filter 241 is comprised of an extended mesh portion 242 (herein the metal mesh screen 243) fixed in an engagement portion 244 (herein the engagement ring 245). In this embodiment, the metal mesh screen 243 is a cone shaped screen 250 having conical sides 254 which form a conical frustum with an open base 252. The cup screen filter 240 can be oriented with the end of the cone shaped screen 250 facing into the refrigerant flow (not shown) or the refrigerant flow traveling into the base 252 of the cone shaped screen 250 as shown in FIG. 4. Flow restriction tests performed on the different types of filters show that the screen should be oriented as shown in FIGS. 3 and 4 so that the flow goes through the base 252 and into the cone shaped screen 250. The testing also indicated that pinched screens increased the flow restriction, but were able to capture and hold more debris material. One improvement of the present invention over the prior art after market filter installations is the improved flow obtained by orienting the filter 240 so that the flow of the refrigerant 102 goes into the cone shaped screen 250. This was an unexpected result in the testing of this unit. The flow tests indicted that an improved flow can be obtained by orienting the flow of the refrigerant 102 into the cone shaped screen 250 of the filter 240 as shown in FIG. 4. This figure shows the filter 240 extending out of the main body 210 of the inlet port filter plate 200 and into the compressor inlet suction port 130 when the inlet port filter plate 200 is installed between the compressor inlet suction port 130 and the suction hose assembly 140.

The cup screen filter 240 dimensions are generally between 0.400 and 0.700 inch diameter. In order to mount a filter 240 in the first passage 220, the inlet port filter plate 200 is constructed with decreasing or reduced stepped diameters in a manner to allow the filter 240 to be installed in the the filter receiving section 230 of the first passage 220 of the inlet port filter plate 200 while ensuring that the filter 240 will not be able to further travel through the outflow section 222 of the first passae 220 and into the compressor 104. The filter receiving section diameter 232 of the filter receiving section 230 where the cup screen filter 240 is installed will be different depending upon the size of the cup screen filter 240 utilized. It is recommended that these filters 240 are selected such that the filter outer diameter 247 is larger than the compressor inlet port connector internal diameter 134 so as to allow for an increased filter inner diameter 246. Thus, the filter 240 is adapted so that the refrigerant flow will not be significantly restricted for the operation of the system 100.

Figure 7:
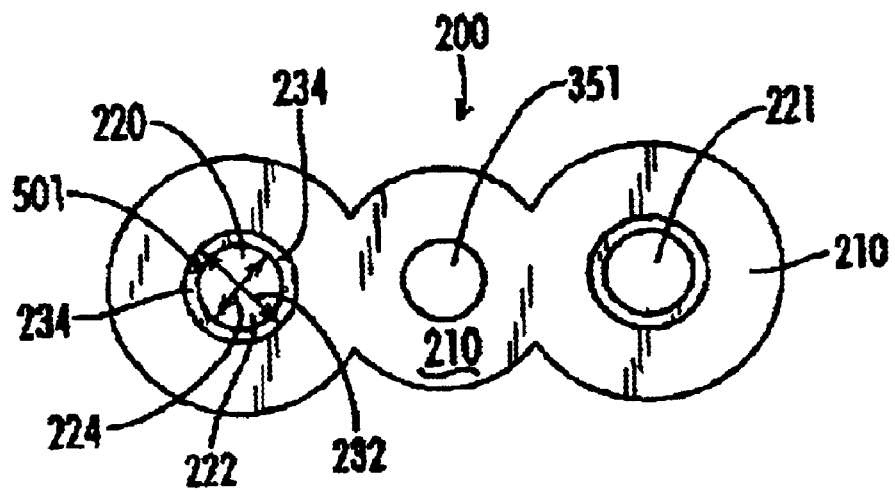
FIG. 7 shows an overhead perspective of an embodiment fitting a large number of GENERAL MOTORS and other type vehicles.
Figure 8:
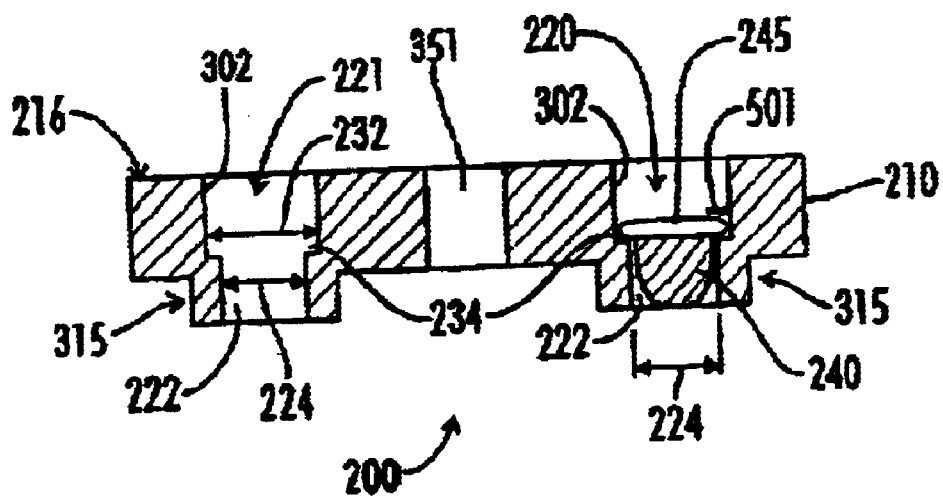
FIG. 8 shows a cross-sectional perspective of the embodiment of FIG. 7.

FIGS. 7 and 8 show dual port inlet port filter plates 200 to allow for multiple refrigerant passages for the low pressure side 112 or to allow for both low pressure side 112 and high pressure refrigerant passages in the first passage 220 and second passage 221, respectively, of the inlet port filter plate 200.

As shown in FIG. 8, the edge 501 of the inlet port filter plate 200 may be crimped over the engaement ring 245 to retain the filter in position. This preferred embodiment of the inlet port filter plate 200 is constructed from aluminum with machined surfaces. The first passage 220 and second passage 221 are shown having outflow sections 222 with a 0.500 inch outflow second diameter 224. The filter receiving section diameters 232 of each of the first passage 220 and the second passage 221 are expanded to provide a 0.548 diameter shelf as a filter receiving area 234 for receiving the engagement ring 245 of the filter 240. Each filter receiving section diameters 232 is expanded to a 0.645 inch diameter in a region adjoining the second side 216 to form an extension receiving area 302 for acceptance of the extension flanges 310 of the suction hose assembly 140. An approximately 0.415 inch fastener opening 351 is proveded as a hole for the pass through of a fastener 350. The inlet port filter plate 200 is manufactured with an approximately 0.500 inch overall parallel thickness with the actual separation of the compressor inlet suction port 130 and the suction hose assembly 140 being limited by a 0.300 inch main body 210 thickness. This 0.300 inch thickness allows for an extension receiving area 302 to be cut to a depth of 0.240 inch for receiving the extension flange 310 of the suction hose assembly connector 142 in order to connect the inlet port filter plate 200 with the suction hose assembly 140. The projection to match the face of the suction hose assembly 140 uses a 0.200 inch main body extension flange 310 projecting from the main body 210 in order to connect the inlet port filter plate 200 to the compressor inlet suction port connector 132.

The present invention has many advantages over the present methods for placing filters 240 in an air conditioning system 100. These advantages include the elimination of the necessity to cut an air conditioning line part of the suction hose assembly 140 to install a filter 240 and the elimination of any special tools or fixtures for the mechanic. In most cases, a further advantage is obtained because the inlet port filter plate 200 can be installed directly to the compressor inlet suction port connector 132.

In most cases when using the inlet port filters plate 200, the filter inner diameter 246 of the cup filter 240 will be significant larger and produce a minimum of restriction to the refrigerant flow. An increased size filter 240 (i.e. a filter 240 having a comparatively greater filter outer diameter 247 and greater filter inner diameter 246) can be installed into an increased size portion (the filter receiving section 230 having a comparatively greater filter receiving section diameter 232) of the first passage 220 of the inlet port filter plate 200. The first passage 220 can then narrow for connection to the compressor inlet port connector 132 (i.e. the outflow section diameter 224 can be equal or greater to the compressor inlet port connector internal diameter 134). Thus, the present invention reduces the possibility of the filter 240 dislodging and entering the compressor 104. As a further advantage of the invention, the inlet port filter plate 200 can be removed from the system 100 and the debris 116 captured by the filter 120 can be removed. The filter 240 can then be reused.

Thus, although there have been described particular embodiments of the present invention of a new and useful Screen Plate Filter for Low Pressure Side of Automotive Air Conditioning Compressor, it is not intended that such references be construed as limitations upon the scope of this invention except as set forth in the following claims.

What is claimed is:

1. An inlet port filter plate for attachment between at least one compressor inlet suction port and a suction hose assembly, the filter plate comprising:

a main body comprising:
   a first side, said first side comprising a first connection opening, said first connection opening adapted to receive a compressor inlet port connector for attachment of the filter plate to compressor inlet port, said compressor inlet port connector having a compressor inlet port connector internal diameter;
   a second side, the second side comprising a second connection opening, said second connection opening adapted to receive a suction hose assembly connector for attachment of the filter plate to the suction hose assembly, said suction hose assembly connector having an suction hose assembly connector internal diameter;
   a first passage, said first passage adapted to allow a refrigerant flow between said second connection opening and said first connection opening, said first passage comprising a filter receiving section and a outflow section, said filter receiving section having at least one filter receiving section diameter and said outflow section having a outflow section diameter, wherein each said at least one receiving section diameter is greater than said outlet flow section diameter, and wherein said filter receiving section further comprises a filter receiving area for receiving a filter; and a filter, said filter comprising a mesh portion and an engagement portion, said engagement portion receiving and retaining said mesh portion, said engagement portion defining a filter outer diameter and said mesh portion defining a filter inner diameter, said filter positioned across said filter receiving section of said first passage, and said engagement portion received and retained within said filter receiving area, wherein, said outlet flow section diameter is at least as great as said compressor inlet port connector internal diameter, wherein, said filter outer diameter is greater than said outlet flow section diameter, wherein said filter outer diameter is greater than said suction hose assembly connector internal diameter, and wherein, said filter inner diameter is maximized such that refrigerant flow restriction caused by said filter is minimized.

2. The apparatus of claim 1 said mesh portion comprising a metal mesh screen and said engagement portion comprising an engagement ring, wherein said engagement ring receives and retains said metal mesh screen.

3. The apparatus of claim 1, said filter comprising a cup screen filter, said cup screen filter further comprising a cone shaped screen, said cone shaped screen having a base comprising said filter inner diameter and conical sides comprising said metal mesh screen, wherein said filter is oriented such that refrigerant flow is directed into the cone.

4. The filter plate of claim 1, the main body of the filter plate further defining a gasket area adapted to receive a gasket for sealing the main body to said suction hose assembly connector.

5. The filter plate of claim 1, wherein the first and second sides of the main body are parallel.

6. The filter plate of claim 1, wherein the main body has an overall parallel thickness dimension of 0.500 inch or less.

7. The filter plate of claim 1, the main body further defining an extension receiving area in the first passage for receiving connection flanges.

8. The filter plate of claim 1, wherein the filter is constructed from a refrigerant compatible material.

9. The filter plate of claim 1, wherein the filter is a mesh screen sized to trap debris which could damage a compressor.

10. The filter plate of claim 1, wherein the filter is installed into a recess within the first passage and secured by crimping.

11. The filter plate of claim 1, the main body further defining a second passage.

12. The filter plate of claim 11, the second passage adapted to allow a refrigerant flow between the first and the second side.

13. An inlet port filter plate for attachment between at least one compressor inlet suction port and a suction hose assembly, the filter plate comprising:

a main body defining a first passage, a first side, and a second side, the first and second sides positioned in a non-parallel relationship;

the first passage adapted to allow a refrigerant flow between the first and the second side;

the first side adapted to sealably connect to the at least one compressor inlet suction port;

the second side adapted to sealably connect to the suction hose assembly; and a filter positioned across the first passage, the filter adapted to stop debris in the refrigerant flow.

* * * * *